2,514,694

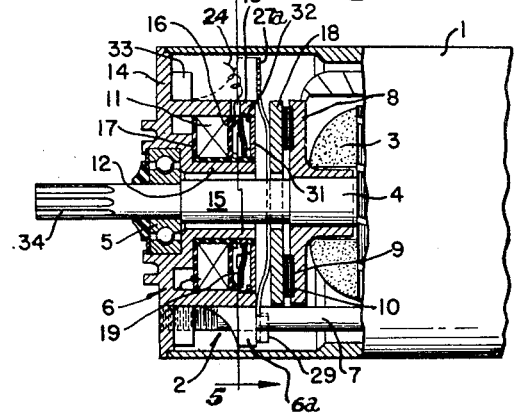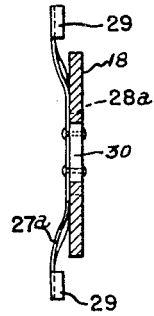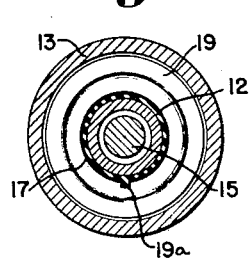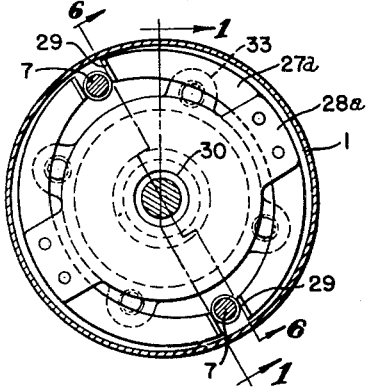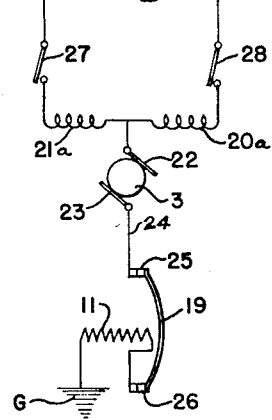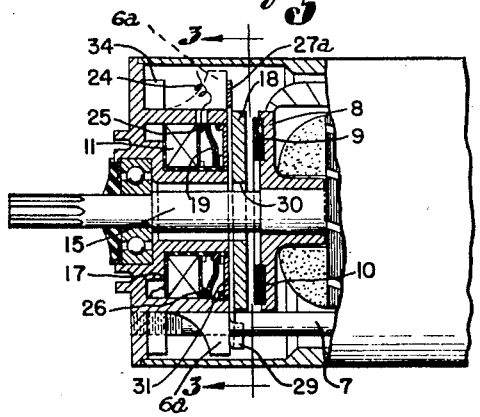
INVENTOR
JAMES E. CHAPMAN
ATTORNEY Patented July 11, 1950

UNITED STATES PATENT OFFICE 2,514,694

ELECTRICALLY CONTROLLED BRAKE

James E. Chapman, Phoenix, Ariz., assignor to The Garrett Corporation, Los Angeles, Calif., a corporation of California Application August 8, 1944, Serial No. 548,534

17 Claims. (Cl. 318—366)

This invention relates to motors, and particularly to electric motors. It concerns a motor brake, and includes thermally controlled means for preventing overloading or overheating of the motor.

While thermal protectors for motors have been employed heretofore, they are ordinarily applied to the outside of the motor, and this location detracts, of course, from their efficiency; that is to say, the location is such as to reduce their effectiveness in responding to the temperature existing within the motor.

One of the objects of this invention is to provide a simplified and compact thermal protector which will have characteristics superior to those associated with thermal protectors of the type referred to above, and which is incorporated with the brake in such a way as to reduce the weight of such a unit.

Another object of the invention is to produce a compact and serviceable electrically controlled brake in which the floating or non-rotating brake member is self-centering, thereby eliminating considerable machining that would otherwise be necessary.

Another object of the invention is to provide an electrical controlled brake for an electric motor with an organization of parts including a brake and an electric coil for controlling the same, and in which the electric brake coil operates as a protector for preventing overheating of the motor, thereby eliminating the electric coil that is usually employed as a protector, and which is generally located on the exterior of the motor.

Another object of the invention is to provide a motor with a brake, and associated thermally sensitive means in a position to have its temperature influenced by the internal temperature of the motor and also by that of the brake itself, thereby providing means not only for preventing overheating of the motor by opening the motor circuit automaitcally, but also providing for operating conditions in which the motor is frequently running for a short time, and in which the brake is applied automatically to stop the motor quickly after it has been running. Under such conditions, the brake itself may become overheated merely by reason of friction developed when the braking force is applied.

Another object of the invention is to provide a brake having an electric coil for controlling the brake by developing electro-magnetic force, and which also acts as a protective resistance to the motor so that over-heating of the coil will effect the automatic opening of the motor circuit.

Further objects of the invention will appear hereinafter.

The invention consists in the novel parts and combination of parts to be described hereinafter, all of which contribute to produce an efficient electrically controlled brake.

A preferred embodiment of the invention is described in the following specification, while the broad scope of the invention is pointed out in the appended claims.

In the drawing, which is shown by way of illustration:

Fig. 1 is a side elevation and partial section through an electric motor embodying my invention, taken on line 1—1 of Fig. 3, and showing the brake in its applied or "on" position.

Fig. 2 is a view similar to Fig. 1 but showing the brake in its unapplied or "off" position.

Fig. 3 is a vertical section taken through the motor casing and shaft on the line 3—3 of Fig. 2, looking toward the non-rotatable brake member.

Fig. 4 is a diagram of the wiring, and illustrating the motor circuit.

Fig. 5 is a cross-section on the line 5—5 of Fig. 1, omitting the brake and the casing shell.

Fig. 6 is a view showing the non-rotatable brake member as viewed in cross-section on the line 6—6 of Fig. 3.

Before proceeding to describe this invention, it should be stated that the elements that cooperate in practicing this invention are disclosed in my co-pending application Serial No. 541,312, filed June 21, 1944.

Referring to the drawings, 1 indicates a motor casing which in the present instance is in the form of a cylindrical shell at one end of which the braking means indicated generally by the reference 2 is located. The armature 3 is carried on a shaft 4 having bearings in the ends or heads of the motor, one of which bearings 5 is illustrated in Fig. 1 as a ball bearing. The brake means 2 is carried in a head 6 that is attached to the end of the casing 1. In the present instance, this attachment is effected by the same means illustrated in my said application Serial No. 541,312, in which two tie-rods or two tie-bolts 7 are employed for securing the cap 6 in place, and also another cap at the other end of the motor (not illustrated) through which the tie-bolts 7 pass to hold that cap in position.

The brake mechanism 2 includes a rotary brake member 8 which is rigid on the shaft 4, and the face of this brake member is provided with a brake liner 9 which may be in the form of a ring of brake material secured in an annular groove or seat 10 formed on an outer face of the brake member or disc 8.

The cap 6 carries an electric coil 11 seated around its nave or hub 12, and located between this hub and an outer cylindrical sleeve 13, said hub and said sleeve being formed integrally with the disc or body portion 14 of the cap. The inner diameter of the nave 12, however, is larger than the shaft 4 within the cap, at which point the shaft has a neck 15 of slightly reduced diameter as compared with the body portion of this shaft.

The coil 11, located as it is, in the cap 6, is in a position so that it will be influenced and affected by the interior temperature of the motor; and between the head 16 of the coil bobbin 17 and the non-rotatable brake member 18 I provide thermal-sensitive means, preferably consisting of a concavo-convex disc 19. This is a bi-metal disc including Invar metal and any other suitable cooperating metal. In other words, this thermal element consists of two concavo-convex discs superposed on each other and attached together to as to produce a snap action or reversing movement of the disc when the temperature rises beyond a predetermined point.

When the motor is operating, current flows through the motor through a circuit including two oppositely wound coils 20a and 21a (see Fig. 4) which are connected in parallel to the motor brushes 22 and 23 and the armature 3 of the motor, the brush 23, for example, being connected by the lead 24 to a fixed contact 25. This contact is located near the edge of the thermal element 19, and a similar contact 26 is located preferably at a diametrically opposite point, as indicated in Fig. 4. In the ordinary operation of the motor, when the motor circuit is closed through either one of the switches 27 and 28, current will flow through the thermal element which will be in contact with the two fixed contacts 25 and 26, the latter contact being connected to the brake coil 11, the other side of which may be grounded at G if the motor is operating on a grounded circuit. Otherwise, brake coil 11 should be connected to a suitable return conductor. With this arrangement, it will be evident that the coil 11 operates as an electro-magnetic coil in which the nave 12 operates as a core, thereby developing a considerable electro-motive force to attract the non-rotatable brake member 18, which should be of magnetic metal or have a magnetic metal part carried thereon so that it will operate as an armature for the coil. This of course would hold the brake member 18 unapplied and in its "off" position, as illustrated in Fig. 2.

If the heat within the motor rises beyond a predetermined point, the thermal means or thermal element will snap over to an opposite position or else change its curvature sufficiently to move the edges of this disc away from the contacts 25 and 26, thereby opening the motor circuit.

When the motor circuit is opened, the brake will be automatically applied, and for this purpose I prefer to employ resilient means consisting of two or more leaf springs 27a which are attached in any suitable manner to the non-rotatable brake member; preferably the middle portions of the springs 27 are attached. These springs, as illustrated in Fig. 3, curve around on a helical curve while conforming to the inner radius of the shell.

In the present instance, the attachment to the springs is accomplished by providing equidistant lugs 28a that project radially out from the disc of this brake member, to which the middle portions of the springs 27a are bolted or riveted. These springs as illustrated in Fig. 3 curve around to conform to the inner radius of the shell. The ends of said springs are adapted to react against lugs 6a, which are shown as being formed integrally with a portion of the head 6. These springs may also serve as part of the means to prevent the rotation of this non-rotatable brake member 18. For this purpose I may provide the ends of the springs 27a with bent ends 29 forming fins that rest against the sides of the tie-bolts 7.

The non-rotatable brake member 18 has a central opening 30 in it which is of considerably larger diameter than the neck 15 of the shaft at which this brake member is mounted so that this non-rotatable brake member is virtually floating in the space between the end of the nave 12 and the rotary brake member 8, being held at all times against rotation by the tie-bolts 7. Whenever the thermal element 19 moves, as it may, to break the circuit at the points 25 and 26, the coil 11 will become de-energized, whereupon the resiliency of the springs 27a will force the brake member 18 against the brake lining 9 and stop the rotation of the motor armature.

Threads 32 are provided in the outer end of the annular wall 13 so that the thermal element may be adjusted nearer or farther from the contacts 25 and 26 by screwing slug or disc 31 in or out on the threads.

This disc 31 is formed of an electrically conductive material so as to act as an element in the magnetic flux circuit to provide a time delay in the action of the magnetic flux circuit to provide a corresponding time delay in the action of the magnetic brake. When the current is cut off from the brake coil 11 the collapse of the magnetic field induces a current in the closed circuit formed by the conductive slug or disc 31, which induced current itself sets up a magnetic field opposing or delaying the collapse of the magnetic field of coil 11. This provides electromagnetic means for attaining more positive action of the non-rotatable member or brake armature 18 by reason of the fact that the time delay provides an initial drag on the brake member 8, thereby building motor current up to maximum stalled value. This also obtains a maximum effect for the ampere-turns in coil circuit 11 when the brake is to be released by energization of motor circuit.

As the thermally sensitive disc 19 is of a material conductive to electricity, it is not necessary to provide any contacts on its edge to cooperate with the contacts 25 and 26, although, if desired, such contacts may be provided as indicated in Fig. 4, in which case the thermal disc would be keyed by an integral tongue or key 19a on the body of the bobbin 17 received in a notch in the edge of the central opening in the thermal element to insure that the contacts on the edge of the disc would always be maintained in alignment with the contacts 25 and 26 (see Fig. 5).

In the motor illustrated, the tie-bolts 7 are secured to the cap 6 by providing threaded ends on these bolts that are secured into threaded sockets in the disc 14 of the cap 6.

In order to facilitate mounting the motor in fixed position, the disc 14 of the cap may be provided with a plurality of lugs 33 (see Fig. 3) which would have threaded sockets cut into them from the outer side of the disc 14 to receive studs, said studs being secured in a suitable support for the motor.

In the operation of this motor it should be understood that the coil 11 does not merely operate as a solenoid coil for controlling the non-rotatable brake member 18, but it also operates through its own resistance as a coil to protect the motor windings from overheating; so if the coil 11 itself has its temperature sufficiently raised by the current passing through it, it will affect the thermal element 19 and cause the thermal element to flatten its shape or snap over to an opposite concavo-convex position which would open the motor circuit at the contacts 25 and 26, thereby de-energizing the coil and enabling the springs 27 to advance the non-rotatable brake member 18 against the rotating brake member 8, which of course will stop the motor.

By regulating the position of the delayer slug 31 the influence of the temperature of the brake coil or the temperature of the armature and field coils can be controlled.

The outer edges of the brake springs 27 lie substantially against the inner face of the casing shell and this operates to center the non-rotatable brake member 18. This avoids the necessity for providing the usual cooperating cylindrical centering faces. This reduces the time required for manufacturing this brake in quantity production.

Many other embodiments of this invention may be resorted to without departing from the spirit of the invention.

I claim as my invention:

1. As a new article of manufacture, a floating brake member including a disc having leaf springs attached thereto, said leaf springs having free ends, and means formed on said springs adjacent the free ends thereof for engagement with fixed members to hold the brake member against rotation.

2. In an electrically controlled brake for an electric motor, the combination of: a rotary brake member; a non-rotatable brake member mounted for movement against or away from the rotary brake member; an electric coil associated with the non-rotatable brake member connected into the motor circuit and operating when energized to hold the non-rotatable brake member away from the rotary brake member; thermal sensitive means associated with the said coil and located adjacent to the same within the motor so as to have its temperature affected by the heat generated by the said coil; means controlled by said thermal sensitive means for opening the motor circuit; and a delayer slug of conductive material, located between the end of the coil and the non-rotatable brake member to provide a time delay in the action of the magnetic flux circuit and thereby provide a time delay in the action of the magnetic brake.

3. In an electrically controlled brake for an electric motor, the combination of: a rotary brake member; a non-rotatable brake member mounted for movement against or away from the rotary brake member; an electric coil associated with the non-rotatable brake member connected into the motor circuit and operating when energized to hold the non-rotatable brake member away from the rotary brake member; thermal sensitive means associated with the said coil and located adjacent to the same within said motor so as to have its temperature affected by the heat generated by the said coil; means controlled by said thermal sensitive means for opening the motor circuit; and a delayer disc of electrically conductive material mounted between the thermally sensitive member and the non-rotatable brake member to provide a time delay in the action of the magnetic flux circuit to thereby provide a time delay in the action of the magnetic brake.

4. As a new article of manufacture, a self-centering floating brake member including a disc with a plurality of arcuate leaf springs attached thereto, said springs being curved to a radius to enable the same to fit into a cylindrical case and center the brake disc therein, and laterally bent end portions on the leaf springs forming fins for engaging a fixed part to prevent rotation of the brake disc.

5. In an electrically controlled brake for an electric motor having a housing, the combination of: brake means for the motor disposed within the motor housing; electric coil means within said housing for controlling the operation of the brake and connected into the motor circuit, said coil operating when energized to release the brake; resilient means for effecting application of the brake when said coil is deenergized; thermally sensitive means within said housing and associated with the coil so as to be affected by the temperature thereof for operating the motor circuit; and means for adjusting the thermally sensitive means toward and away from said coil.

6. In an electrically controlled brake for an electric motor unit, the combination of: brake means for the motor; an electric coil within the motor unit for controlling operation of the brake, said coil being connected into the motor circuit and, when de-energized, permitting application of the brake; means for affecting application of the brake when said coil is de-energized; a switch for the coil circuit, including a pair of spaced contacts disposed adjacent said coil; and thermally sensitive means within said motor unit and associated with the coil so as to be affected by the temperature thereof, said thermally sensitive means being adapted to engage the contacts under prescribed temperature conditions and to disengage said contacts under other temperature conditions.

7. The invention defined by claim 6, including means for adjusting the position of the thermally sensitive means toward and away from said coil and contacts.

8. In an electrically controlled brake for an electric motor unit, the combination of: brake means for the motor; an electric coil for controlling the operation of the brake, said coil being connected into the motor circuit and, when de-energized, to permit application of the brake; an annular wall forming a housing for the coil and disposed within the motor unit; thermally sensitive means located within the housing so as to be affected by the temperature of the coil for opening the motor circuit; and a disc threaded into the housing on the side of the thermally sensitive means opposite the coil, said disc providing means for adjusting the position of the thermally sensitive means relative to the coil.

9. In an electrically controlled brake for an electric motor having a circuit and a casing, the combination of: brake means for the motor, said brake means including a non-rotatably mounted brake member; means for moving said non-rotatably mounted brake member so as to effect application of the brake; an electric coil within the casing for controlling the operation of the brake and connected into the motor circuit so as to be energized simultaneously with said motor circuit, said coil, when energized, being adapted to move said non-rotatably mounted brake member out of braking position; means for moving said non-rotatably mounted brake member so as to apply said brake when said motor circuit and said electric coil are de-energized; thermally sensitive means within said motor casing and associated with the coil so as to be affected by the temperature of the coil for opening the motor circuit, said thermally sensitive means being located between the non-rotatable brake member and said coil.

10. An armature brake for electric motors comprising, in combination with a motor casing having abutment means projecting generally radially inwardly therefrom and elements projecting axially from said abutment means, an armature, a brake member affixed to said armature, a floating brake member cooperable with said affixed brake member and shiftable axially for disengagement therefrom, a plurality of leaf springs secured to said floating brake member and having free end portions abutted against said abutment means and axially flexed between said abutment means and said floating brake member so as to bias the latter toward braking engagement with said affixed brake member, said free end portions of said springs being arranged for circumferentially abutting engagement with said axially projecting elements to resist braking torque induced rotation of said floating brake member, and electromagnetic means associated with said floating brake member and adapted when said motor is energized to move said floating brake member axially away from interengagement with said affixed brake member.

11. An armature brake for an electric motor comprising, in combination with a motor casing and an armature therein: a brake member affixed to said armature and having an axially facing braking surface; a floating brake member arranged for coaction with said braking surface; leaf type spring means secured to said floating brake member and having a plurality of free end portions projecting therefrom; and means in fixed relation to said casing abutting said free end spring portions both axially and circumferentially so as to flex said free end portions axially to bias said floating brake member toward engagement with said braking surface and to resist braking torque induced rotation of said floating braking member.

12. An armature brake for electric motors, comprising, in combination with a motor casing and an armature therein: a brake element affixed to said armature and having an axially facing braking surface; generally annularly spaced fixed abutments within the motor casing; other generally annularly spaced fixed members within said casing; a floating brake member arranged to coact with said braking surface and axially shiftable out of braking engagement therewith; means for reactively connecting the floating brake member with said abutments, said means being adapted to yieldingly urge the floating brake member into engagement with said braking surface and including free end portions which engage said other annularly spaced members for restraining said floating brake member against torque induced rotation thereof; and electromagnetic means for shifting said floating brake member axially when said motor is energized.

13. The invention defined by claim 12 wherein said first-mentioned means constitutes the sole means for supporting and centering said floating brake member.

14. As a new article of manufacture: a self-centering floating brake member including a disc with a plurality of spring leaves attached thereto, said spring leaves being so shaped as to fit into a case and center the brake disc therein; and end portions for said leaf springs adapted to engage a fixed part to prevent rotation of the brake disc.

15. An armature brake for an electric motor having a motor casing with abutment means projecting generally radially inwardly therefrom, elements projecting axially from said abutment means, an armature, and a brake member affixed to said armature, comprising: a floating brake member cooperable with said affixed brake member and shiftable axially from disengagement therefrom; a plurality of leaf springs secured to said floating brake member and having free end portions abutted against said abutment means and axially flexible between said abutment means and said floating brake member so as to bias the latter toward braking engagement with said affixed brake member, said free end portions of said springs being arranged for circumferential abutting engagement with said axially projecting elements to resist braking torque induced rotation of said floating brake member; and electrical means associated with the floating brake member and adapted, when the motor is energized, to move said floating brake member axially away from engagement with said fixed brake member.

16. In a brake for an electric motor having a casing, an armature therein having a shaft, a rotatable brake member secured to said shaft and tie-bolts securing the motor parts together: a floating brake member arranged for axial movement so as to move into engagement with and disengagement from said rotatable brake member; leaf-type springs associated with the floating brake member, the end portions of said springs being engageable with the tie-bolts to prevent rotation of the floating brake member, said leaf-type springs being so constructed and arranged as to urge the floating brake member into engagement with the rotatable brake member and having marginal portions engageable with the interior of the casing for centering the floating brake member; and means for effecting disengagement of the floating brake member from the rotatable brake member.

17. An armature brake for electric motors, comprising, in combination with a motor casing and an armature therein: a brake element affixed to said armature and having an axially facing braking surface; fixed abutments within the motor casing; other fixed members within said casing: a floating brake member arranged to coact with said braking surface and axially shiftable out of braking engagement therewith; means for reactively connecting the floating brake member with said abutments, said means being adapted to yieldingly urge the floating brake member into engagement with said surface, said means also including free end portions which engage said other members for restraining said floating brake member against torque induced rotation thereof; and electromagnetic means for shifting said floating brake member axially when said motor is energized.

JAMES E. CHAPMAN.

(References on following page)

REFERENCES CITED

The following references are of record in the file of this patent:

UNITED STATES PATENTS

| Number | Name | Date |
|---|---|---|
| 688,670 | McGeorge | Dec. 10, 1901 |
| 736,461 | Thresher | Aug. 18, 1903 |
| 1,004,860 | Eastwood | Oct. 3, 1911 |
| 1,005,857 | Lindquist | Oct. 17, 1911 |
| 1,320,487 | Milne | Nov. 4, 1919 |
| 1,852,574 | Howe | Apr. 5, 1932 |
| 1,944,831 | Whyte | Jan. 23, 1934 |
| 2,085,872 | Schoepf et al. | July 6, 1937 |
| 2,183,724 | Schroder | Dec. 19, 1939 |
| 2,279,214 | Veinott | Apr. 7, 1942 |
| 2,280,599 | Milan | Apr. 21, 1942 |
| 2,368,317 | Meyer et al. | Jan. 30, 1945 |
| 2,410,630 | Chilman | Nov. 5, 1946 |